United States Patent [19]

Chen

[11] Patent Number: 5,737,974
[45] Date of Patent: Apr. 14, 1998

[54] FASTENING ASSEMBLY OF BICYCLE UPRIGHT TUBE

[76] Inventor: Chia-Lung Chen, 33-4, Pu Kang Road, Chu Shui Village, Pu Yai Hsiang, Changhua, Taiwan

[21] Appl. No.: 687,177

[22] Filed: Jul. 25, 1996

[51] Int. Cl.$^6$ .................................................. B62K 21/18
[52] U.S. Cl. ..................... 74/551.1; 280/279; 403/370; 403/374
[58] Field of Search ....................... 74/551.1, 551.3; 280/279, 280; 403/370, 371, 374

[56] References Cited

U.S. PATENT DOCUMENTS

| | | | |
|---|---|---|---|
| 5,201,242 | 4/1993 | Chi | 74/551.1 |
| 5,387,255 | 2/1995 | Chiang | 74/551.1 |

*Primary Examiner*—Charles A. Marmor
*Assistant Examiner*—Mary Ann Battista

*Attorney, Agent, or Firm*—Beveridge, DeGrandi, Weilacher & Young, LLP

[57] ABSTRACT

A bicycle upright tube fastening assembly comprises a handlebar upright tube, a bolt, a tightening head, an arresting tube, a torsion spring, a nut, a head tube, a from fork tube column, and a bearing set which is composed of a mounting seat, a ball bowl, a rolling ball slot seat and a ball nest. The mounting seat is provided therein with an upper tapered portion and a lower tapered portion. An upper fitting ring is received in the upper tapered portion while a lower fitting ring is received in the lower tapered portion. The ball bowl is provided with a straight center hole having at one end thereof a tapered protuberance which is engaged with the lower tapered portion of the mounting seat such that one end of the tapered protuberance urges the lower fitting ring of the mounting seat. The rolling ball slot seat is urged by the head tube when a pressure exerting on the mounting seat is transmitted to the ball bowl and the ball nest which is located between the ball bowl and the rolling ball slot seat.

1 Claim, 4 Drawing Sheets

FASTENING ASSEMBLY OF BICYCLE UPRIGHT TUBE

FIELD OF THE INVENTION

The present invention relates generally to a bicycle upright tube, and more particularly in a fastening assembly of the bicycle upright tube.

BACKGROUND OF THE INVENTION

As illustrated in FIGS. 3 and 4, a conventional fastening assembly of the bicycle upright tube is composed of a handlebar upright tube A provided at the top end thereof with a stop cover A2 which has a deep hole A1, engageable with an upper bolt B. A front fork tube D is extended from a front tube E and is provided with a bearing set F fitted thereover. The bearing set F is composed of a tapered inner ring F1, a ball bowl F2, a ball nest F3, and a rolling ball slot seat F4. The handlebar upright tube A is joined with the front fork tube D such that the bottom edge of the handlebar upright tube A is rested against the inner ring F1 of the bearing set F. An arresting block G is provided with a threaded hole G2 and a round arresting piece G1. The arresting block G is fitted securely into the hollow interior of the front fork tube D before the upper bolt B is engaged with the arresting block G. The handlebar upright tube A is fastened securely by the round arresting piece G1 and the stopping cover A2.

The bearing set F described above is vulnerable to damage in view of ball bowl F2 and the ball nest F3 which are separated by a thin layer and are vulnerable to crack after being exerted on by the pressure for a prolonged period of time.

SUMMARY OF THE INVENTION

It is therefore the primary objective of the present invention to provide a bicycle with an upright tube fastening assembly which is composed of a handlebar upright tube, a bolt, a tightening head, an arresting tube, a nut, a torsion spring, a front fork tube, a head tube, and a bearing set. The present invention is characterized in that the bearing set comprises a mounting seat having an inner edge provided with an upper tapered portion and a lower tapered portion, which are provided respectively with a fitting ring. The bearing set further comprises a ball bowl having a straight center hole so as to enable the ball bowl and the bowl nest to bear a greater pressure. As a result, the bearing set of the present invention is more durable than the conventional bearing set.

DETAILED DESCRIPTION OF THE EMBODIMENT

Figure 1:
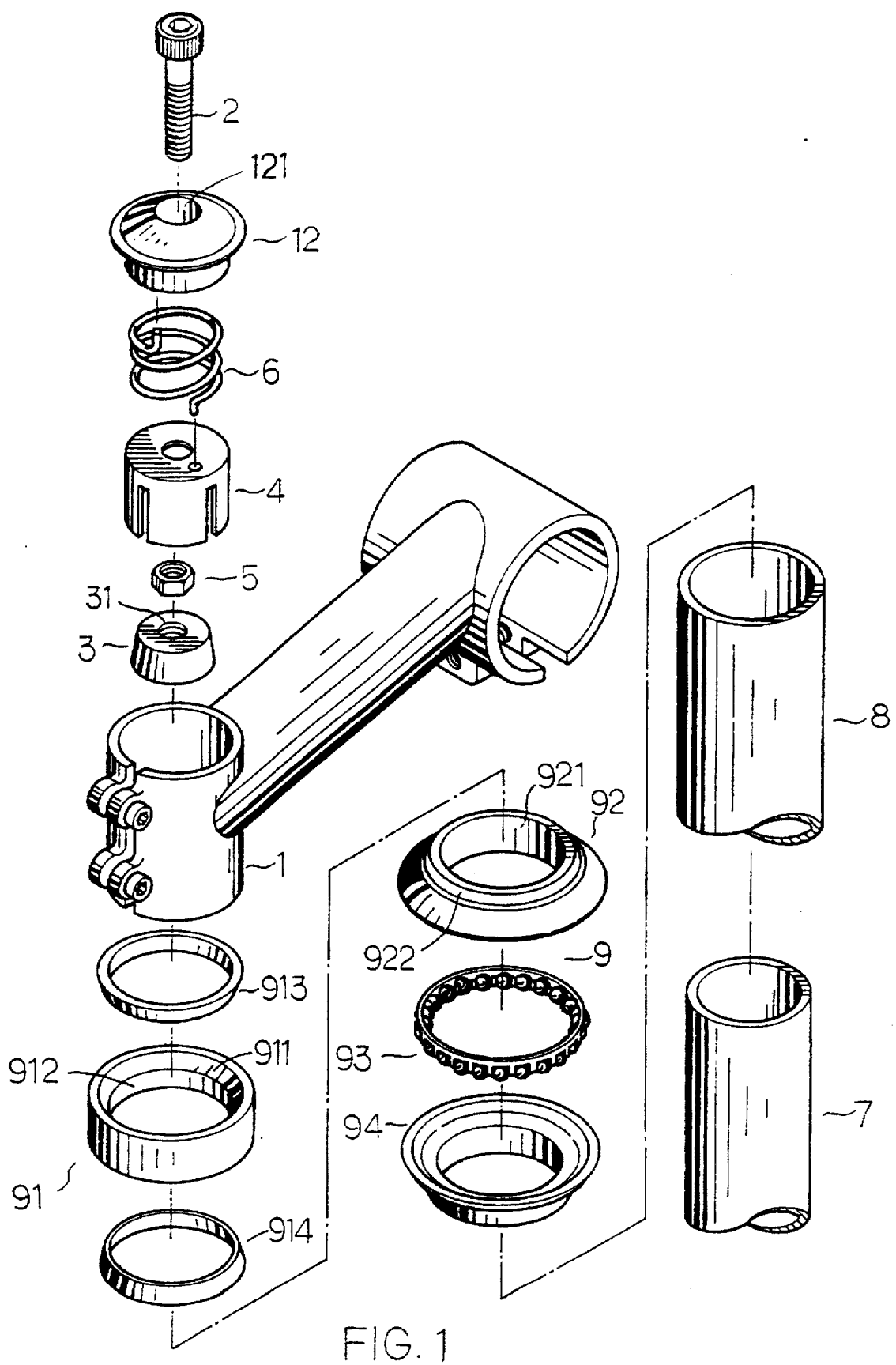
FIG. 1 shows an exploded view of a bicycle upright tube fastening assembly of the present invention.
Figure 2:
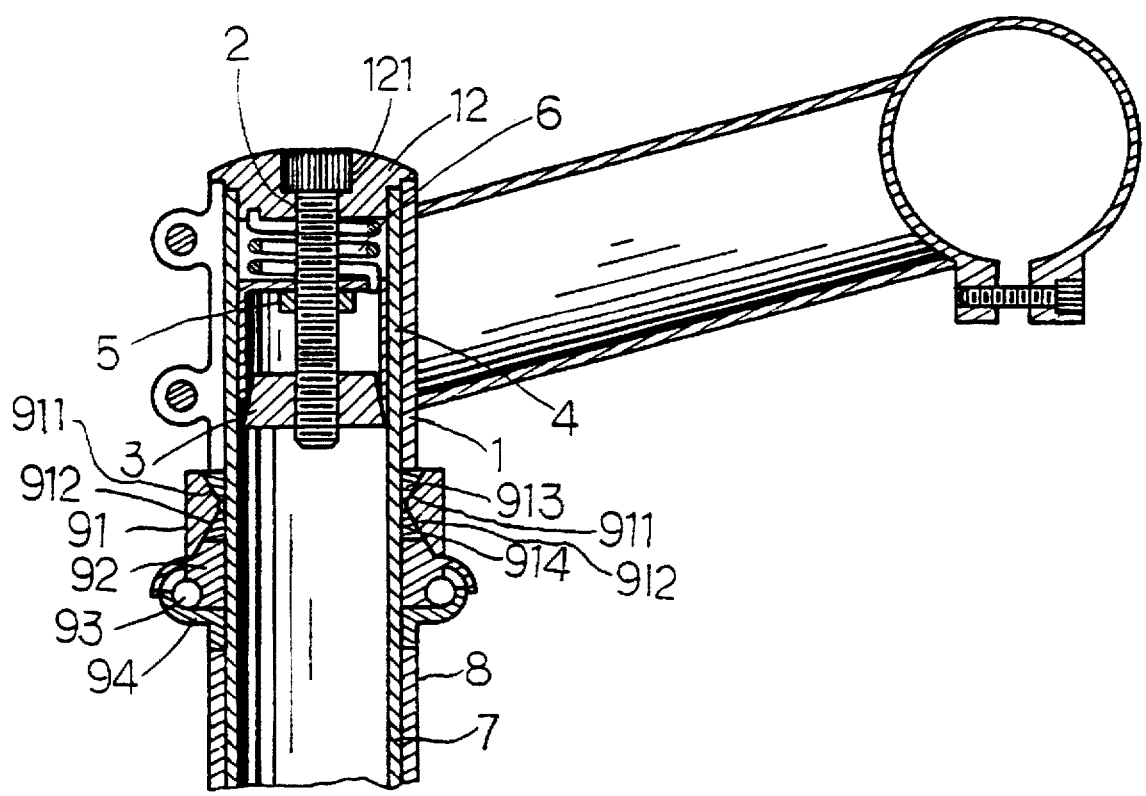
FIG. 2 shows a sectional view of the present invention in combination.
Figure 3:
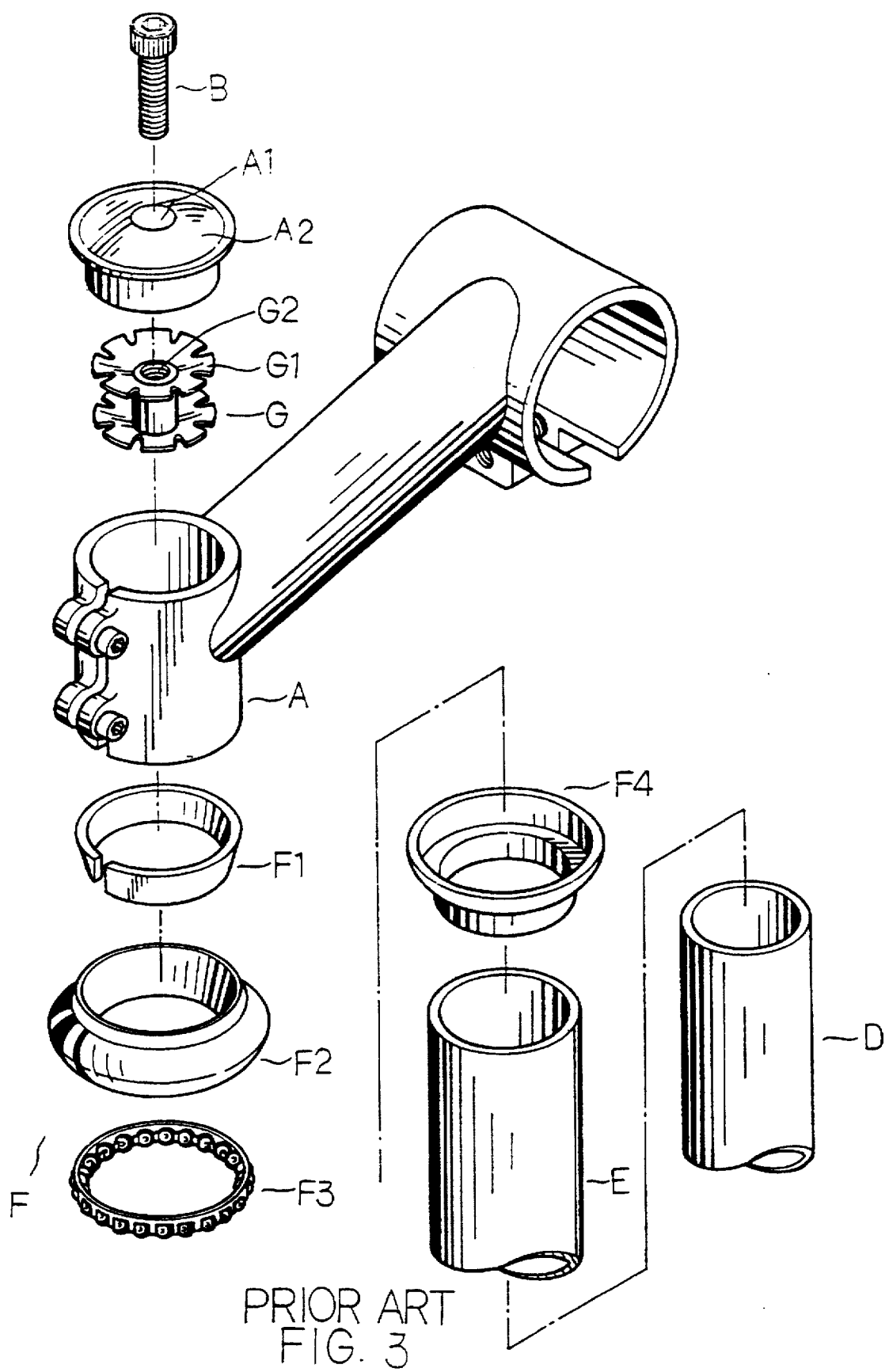
FIG. 3 shows an exploded view of a bicycle upright tube fastening assembly of the prior art.
Figure 4:
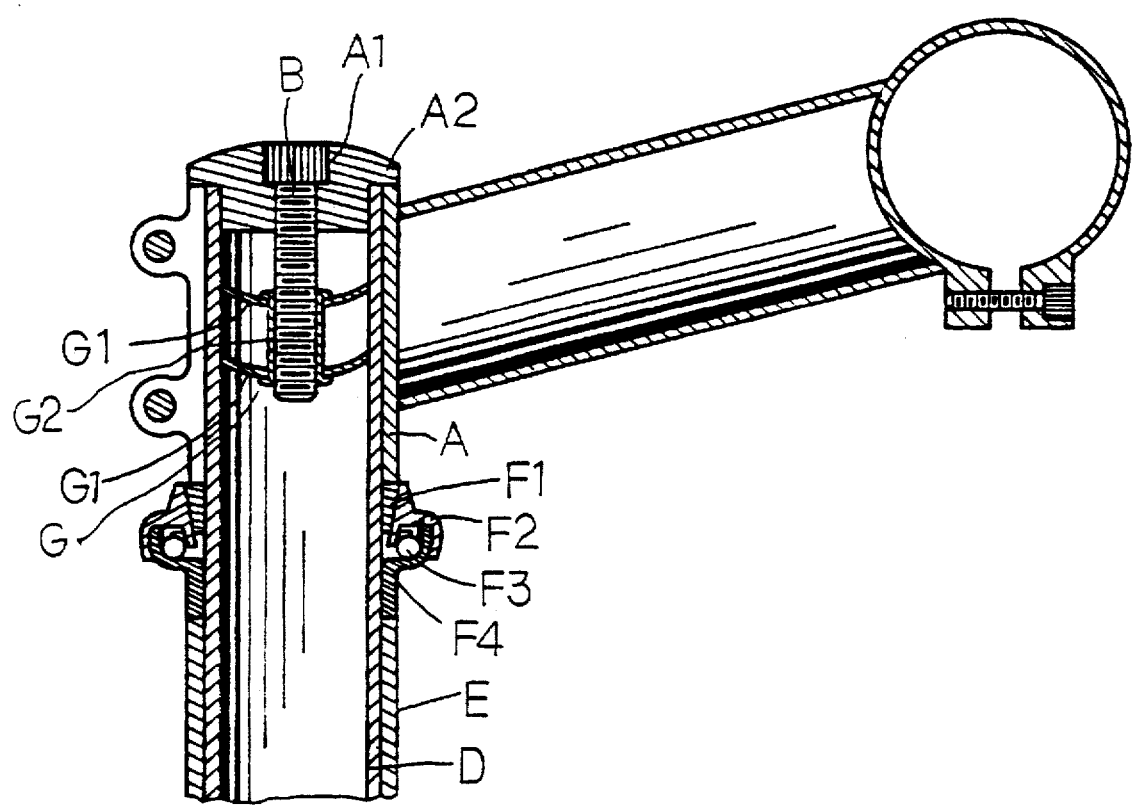
FIG. 4 shows a sectional view of the prior art bicycle upright tube fastening assembly in combination.

As shown in FIGS. 1 and 2, the bicycle upright tube fastening assembly of the present invention comprises a handlebar upright tube 1, a bolt 2, a tightening head 3, an arresting tube 4, a nut 5, a torsion spring 6, a front fork tube column 7, a head tube 8, and a bearing set 9.

The handlebar upright tube 1 is provided at the top end thereof with a stop cover 12 having an axial hole 121 engageable with the bolt 2 which is fitted into the torsion spring 6 and the arresting tube 4 in which the bolt 2 is engaged with the nut 5. The tightening head 3 is provided with a threaded hole 31 engageable with the tightening head 3 and the bolt 2. The bearing set 9 is fitted over the front fork tube column 7 such that the beating set 9 is located between the handlebar upright tube 1 and the head tube 8. The bearing set 9 comprises a mounting sear 91, a ball bowl 92, a ball nest 93, and a rolling ball slot seat 94. The mounting seat 91 is provided in the inner edges thereof with an upper tapered portion 911 and a lower tapered portion 912. An upper fitting ring 913 is fitted into the upper tapered portion 911 while a lower fitting ting 914 is fitted into the lower tapered portion 912. The ball bowl 92 is provided with a straight center hole 921, which is provided at the upper end thereof with a tapered protuberance 922 engageable with the lower tapered portion 912 of the mounting seat 91 such that the top end of the tapered protuberance 922 urges the bottom end of the lower fitting ring 914 of the mounting seat 91. In the meantime, the bottom edge of the handlebar upright tube 1 urges the upper fitting ring 913 while the lower end edge of the rolling ball slot seat 94 is stopped by the upper end edge of the head tube 8.

The rolling ball slot seat 94 is urged by the head tube 8 when the pressure exerting on the mounting seat 91 is transmitted to the ball bowl 92 and the ball nest 93. As a result, the ball bowl 92 can be provided with the straight center hole 921 so as to provided between the ball bowl 92 and the ball nest 93 with an inner edge having a greater thickness enabling the ball bowl 92 and the ball nest 93 to withstand a greater pressure. The bearing set 9 of the present invention is therefore more durable than that of the prior art.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A bicycle upright tube fastening assembly comprising:

a handlebar upright tube provided at one end thereof with a stop cover having an axial hole;

a bolt engaging said axial hole of said stop cover of said handlebar upright tube;

a tightening head provided with a threaded hole engageable with one end of said bolt;

an arresting tube fitted over said bolt;

a torsion spring fitted over said bolt, said spring connected to said stop cover and said arresting tube;

a nut located in said arresting tube such that said nut is engaged with said bolt;

a head tube;

a front fork tube column fitted into said head tube; and a bearing set fitted over said front fork tube column such that said bearing set is located between said handlebar upright tube and said head tube;

wherein said bearing set comprises:

a mounting seat provided therein with an upper tapered portion receiving therein an upper fitting ring, said mounting seat further provided therein with a lower tapered portion receiving therein a lower fitting ring;

a ball bowl provided with a straight center hole having at one end thereof a tapered protuberance which is engaged with said lower tapered portion of said mounting seat such that one end of said tapered protuberance urges said lower fitting ring of said mounting seat;

a rolling ball slot seat stopped by said head tube such that said rolling ball slot seat is urged by said head tube when a pressure exerting on said mounting seat is transmitted to said ball bowl; and a ball nest disposed between said ball bowl and said rolling ball slot seat such that said ball nest is capable of withstanding said pressure exerting on said mounting seat.

* * * * *